Jan. 13, 1925.
D. T. GLEASON
SPRING ANCHORAGE
Filed April 4, 1921
1,522,511
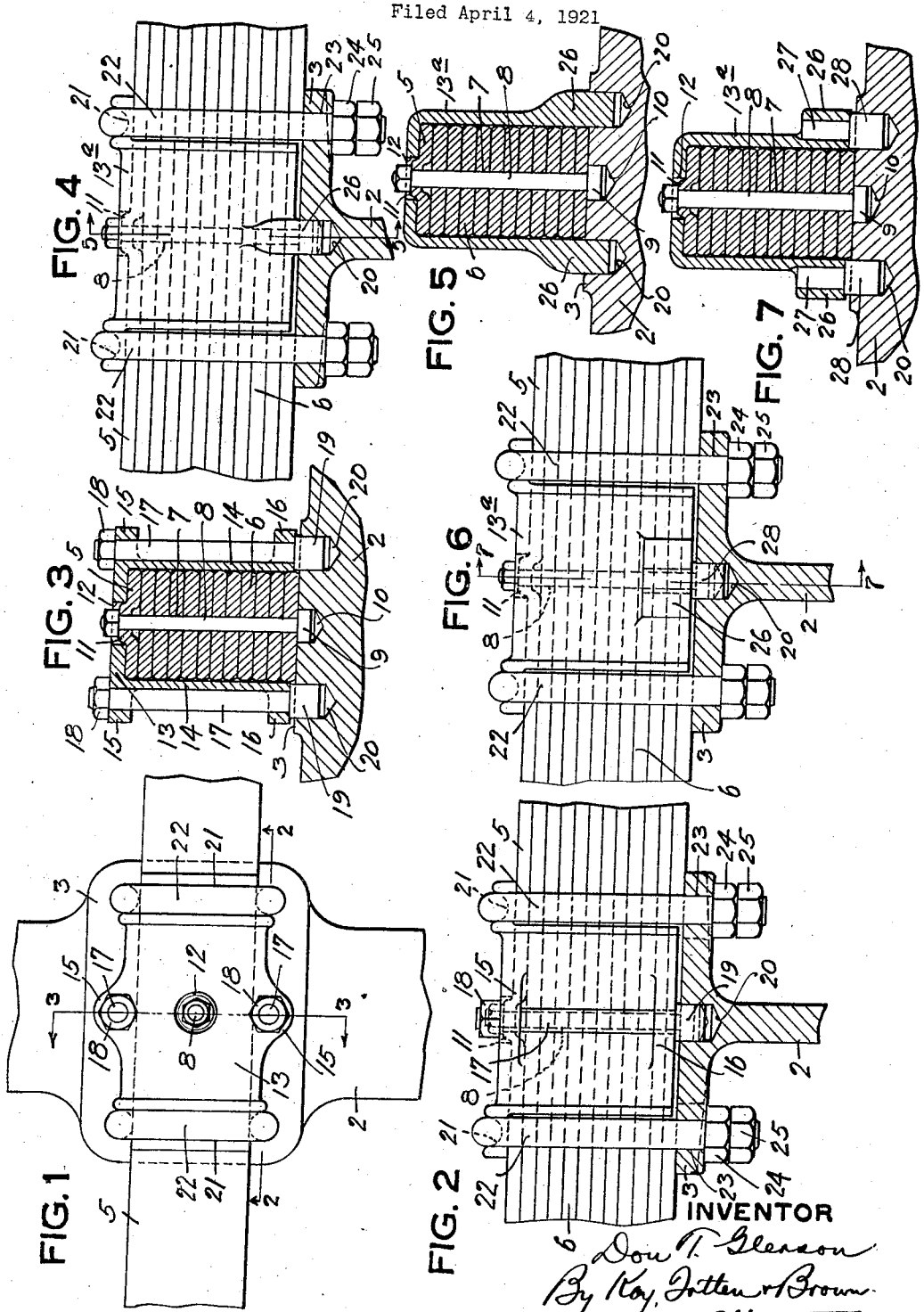
INVENTOR
Don T. Gleason
By Kay, Totten & Brown
Attorneys Patented Jan. 13, 1925.

1,522,511

UNITED STATES PATENT OFFICE.

DON T. GLEASON, OF CORAOPOLIS, PENNSYLVANIA.

SPRING ANCHORAGE.

Application filed April 4, 1921. Serial No. 458,191.

*To all whom it may concern:*

Be it known that I, DON T. GLEASON, a citizen of the United States, and resident of Coraopolis, in the county of Allegheny and State of Pennsylvania, have invented a new and useful Improvement in Spring Anchorage; and I do hereby declare the following to be a full, clear, and exact description thereof.

My invention relates to laminated leaf-springs for vehicles, and it has special reference to anchorage means for attaching such a spring to the axle of the vehicle.

The object of my invention is to provide a spring anchorage of the character indicated which shall be simple and rugged in construction and which shall operate to connect the main leaf of the spring directly to the axle of the vehicle in a perfectly rigid manner without weakening the spring leaves, and without transmitting driving forces through the shorter leaves.

My invention aims to improve the spring anchorage of vehicles of the type in which the drive and torque are transmitted between the wheels and body of the vehicle through the springs. This, in many respects, is a preferred form of drive for motor trucks and other vehicles, but its usefulness is limited by the tendency of the connection between the axle and springs to to become loose, thus premitting the axle to move out of its correct position, which leads to broken spring leaves, grinds the tires of the vehicle sidewise against the road, and, in the case of the rear axle, produces troubles in the differential and sometimes sets one of the brakes. For these reasons various attempts have been made to improve the connection between the spring and axle in drives of this kind, the ordinary shackle bolts being replaced or supplemented by center fastenings, such as bolts passing through all of the spring leaves. Such bolts, if strong enough to have any substantial anchorage effects, weaken the spring leaves. Other center anchorage devices involve forming projections, kinks or dished portions on the spring leaves in such a way that when the leaves are in position the projections will nest together, for the purpose of holding the leaves against relative horizontal movement. Unless the projections are machined, which is not practicable, the projections will not nest together properly, and such a nested construction is effective only as long as the leaves are clamped tightly together, which clamping action depends on the ordinary shackle bolts. In this nested contruction, the driving forces are transmitted through the nested projections in the leaves, and all the leaves take part in this action. If the shackle bolts work loose, a creeping movement takes place between the leaves which soon shifts, and may entirely destroy, the effective connection between the main driving leaf and the axle.

Where an ordinary semi-elliptical laminated leaf-spring is used as the means for transmitting, the top or longest leaf does substantially all of the work of transmitting the drive and torque, and therefore the chief requirement for an effective spring anchorage is that the top or main leaf shall be connected rigidly to the axle and prevented from movement with respect to the axle. According to my present invention I accomplished this result without affecting the intermediate shorter leaves by surrounding the spring, adjacent to the axle, with a three-sided shroud or housing to which the top leaf of the spring is connected in the manner described below, and which is rigidly secured to the spring seat of the axle by means independent of the usual shackle bolts. By these means the main spring-leaf is prevented from movement in any horizontal direction with respect to the axle, and at the same time none of the spring-leaves are weakened.

In the accompanying drawing, which shows some of the many ways in which my invention may be carried out in practice, Fig. 1 is a plan view of a portion of a vehicle axle and spring provided with my improved anchorage; Fig. 2 is a side elevational view, with parts in section, of the construction shown in Fig. 1, the section being taken substantially on the line 2—2, Fig. 1; Fig. 3 is a transverse sectional view through the spring and its anchorage, the section being taken substantially on the line 3—3, Fig. 1; Fig. 4 is a side view partly in elevation and partly in section, similar to Fig. 2, and showing a modified form of anchorage; Fig. 5 is a central sectional view of the construction shown in Fig. 4, the section being taken substantially on the line 5—5, Fig. 4; Fig. 6 is a side view similar to Figs. 2 and 4, showing a still further modification of my invention; and Fig. 7 is a central cross-sectional view taken substantially on the line 7—7, Fig. 6.

Referring first to Figs. 1, 2 and 3 of the drawing, the numeral 2 designates a vehicle axle of ordinary construction, having the usual spring seat 3 upon which rests a semi-elliptical laminated spring composed of an upper main leaf 5 and a set of shorter under leaves 6. All of the leaves 5 and 6 may, as usual, be provided with central openings 7 of such small diameter as not to materially weaken the spring-leaves, the openings 7 being arranged to register when the leaves are properly positioned, and a bolt 8 being passed loosely through the openings and having a head 9 received in an opening 10 in the top of the spring seat 3. If desired, the openings 7 and the bolt 8 may be omitted, but for convenience in assembling and mounting the springs I prefer to employ this construction, as shown.

As best shown in Fig. 3, the upper or main leaf 5 of the spring is provided with an upwardly extending circular boss or projection 11 which extends into a seat which, in this instance, is an opening 12 formed in the top of a shroud or housing 13 which has side portions 14 extending down adjacent to the edges of the spring leaves and nearly to the upper surface of the spring seat 3. The shroud or housing 13 forms, in effect, a three-sided box which surrounds the spring-leaves adjacent to the axle and is connected to the upper spring leaf 5 by means of the projection 11 on the spring-leaf and the opening 12 in the top of the housing.

The housing 13 is provided with upper lugs 15 which extend out from the center of the housing and with lower lugs 16 directly below the lugs 15. The lugs 15 and 16 are provided with openings to receive vertical bolts 17, the upper ends of which are threaded to receive nuts 18, while the lower ends are provided with heads 19 adapted to be driven into openings 20 in the upper surface of the spring seat 3.

The housing 13 is also provided at its ends with rounded projections 21 having channels which form seats for U-shaped shackle bolts 22. These shackle bolts are such as are ordinarily employed for attaching leaf-springs to axles, and extend through openings 23 in the flanges of the axle 2, beneath which they are fastened in position by means of nuts 24 and 25.

It will be observed that the housing 13 transmits driving forces from the axle 2 directly to the upper or main leaf 5, through the bolts 17, the lugs 15 and 16, the sides and top of the housing 13, and the projection 11 on the upper leaf 5. It will also be evident that when the parts are assembled in the manner described, no movement is possible between the axle, the housing, and the upper spring leaf, such relative movement being resisted both by the housing bolts 17 and by the shackle bolts 22. Furthermore, it is impossible for the housing to be distorted by lateral stresses on account of its rigid box-like construction.

It will be evident that the construction of Figs. 1 and 2 may be modified by omitting the bolts 17 and by relying upon the shackle bolts 22 to connect the housing 13 rigidly with the axle 2. In such a case the ribs shown adjacent to the shackle bolts on Fig. 2 cooperate with the shackle bolts to prevent lengthwise movement of the housing with respect to the axle.

The modification shown in Figs. 4 and 5 operates in the same manner as that shown in Figs. 1 to 3, and the corresponding parts are similarly numbered. The housing 13$^a$ of Figs. 4 and 5, however, differs from the housing 13 of Figs. 1 to 3 in that the lugs 15 and 16 and the bolts 17 are omitted, and the housing itself is provided near the center of each of its lower ends with projections 26 which extend outwardly and downwardly in the form of pins which enter the openings 20 in the axle. The projections 26 may, however, be omitted and the shackle bolts 22 may be relied upon for rigidly connecting the housing with the axle.

The modification shown in Figs. 6 and 7 may be regarded as a combination of what is shown in the preceding figures. Like the modification of Figs. 4 and 5 the form shown in Figs. 6 and 7 has a housing 13$^a$ provided with central lateral projections 26, but these projections are not extended to form pins, as in Figs. 4 and 5, but are provided with openings to receive the reduced upper ends 27 of short vertical pins 28 which extend into the openings 20 and form the connection between the housing and the axle.

In all of the several forms of my invention herein shown, the connection between the top of the shroud or housing and the main upper spring-leaf is formed in the same manner, by means of the projection 11 seated in the opening 12 in the top of the housing.

My improved spring anchorage may be employed either for securing an overhung spring to the top of the axle, as herein shown, or for securing an underhung spring to the bottom of the axle. In the latter case, the upper leaf is provided, as usual, with a projection fitting into an opening in the bottom of the axle and the housing is applied from below and attached to the axle in the manner described above. The housing attachment in the underhung construction, has the principal advantage of preventing shifting between the spring and the axle.

While I have shown and described certain embodiments of my invention which I now prefer to employ in actual practice, it is to be understood that various other modifications may be readily devised without departing from my invention, and I therefore desire that no limitations be imposed upon my invention except such as are indicated in the appended claims.

I claim as my invention:

1. A spring anchorage for connecting a laminated leaf-spring to a vehicle axle, comprising an integral three-sided casing fitting over the spring, means for connecting the said casing rigidly to the axle, and means for connecting said casing rigidly to the main or driving spring leaf comprising a seat formed in said casing and a projection formed in the said main spring leaf, but not extending to the sides thereof, the said projection fitting within the said opening in said casing.

2. In combination, a vehicle axle, a spring supported upon the said axle and comprising a plurality of superposed leaves, and means for connecting the main or driving leaf of the said spring directly to the said axle and for preventing relative movement between the said spring leaf and axle, said connecting means comprising a three-sided casing fitting over the spring, means for connecting said casing rigidly to the axle, and means for connecting said casing rigidly to the main spring leaf comprising a projection formed on said outer spring leaf, but not extending to the sides thereof, the said projection fitting into a seat formed in said casing.

3. In combination, a vehicle axle, a leaf-spring carried by the said axle, a three-sided housing fitting over the said spring adjacent to the said axle and having a seat adjacent to the main driving leaf of the said spring, a projection formed on the said main driving spring-leaf and of less width than said driving leaf, said projection extending into the said seat and means for securing the said housing to the said axle.

4. In combination, a vehicle axle, a leaf-spring carried by the said axle, a housing fitting over the said spring adjacent to the said axle and having an opening adjacent to the main driving leaf of the said spring, a circular projection formed on the said main driving spring-leaf and extending into the said opening, and means for securing the said housing to the said axle, the said securing means comprising lugs extending laterally from the said housing and bolts extending through openings in the said lugs and received in openings in the said axle.

5. In combination, a vehicle axle, a leaf-spring carried by the said axle, a housing surrounding the said spring adjacent to the said axle, and having an opening adjacent to the main driving leaf of the said spring, a projection formed on the said main driving spring-leaf and extending into the said opening and means for securing the said housing to the said axle, the said securing means comprising projections extending outwardly and downwardly from the sides of the said housing and received in openings in the said axle.

6. In combination, a vehicle axle, a leaf-spring carried by the said axle, a housing surrounding the said spring adjacent to the said axle and having an opening adjacent to the main driving leaf of the said spring, a projection formed on the said main driving spring-leaf and extending into the said opening and means for securing the said housing to the said axle, the said securing means comprising projections extending laterally from the sides of the said housing and provided with openings extending vertically therethrough, and pins received in the said openings and also received in other openings formed in the said axle.

7. In combination, a vehicle axle, a leaf-spring resting upon the said axle, a three-sided and substantially rectangular housing surrounding the said spring adjacent to the said axle and having an opening adjacent to the top and center of the main driving leaf of the said spring, a projection formed on the said main driving spring-leaf and extending into the said opening, and means carried by the said housing and extending into openings in the said axle, whereby relative movement between the said housing and axle are prevented.

8. A spring anchorage for connecting a leaf spring to a vehicle axle comprising a member rigidly connected to the axle, and means for also connecting said member rigidly to the main or driving spring leaf, said connecting means comprising a seat formed in said member and a projection formed in the said main spring leaf and of less width than the said spring leaf, the said projection fitting within the said seat.

9. In combination, a vehicle axle, a leaf spring carried by the said axle, a substantially rectangular housing surrounding the said spring adjacent to the said axle and having a seat adjacent to the top and center of the main driving leaf of the said spring, a projection formed on the said main driving spring leaf and extending into the said seat, and means for rigidly connecting the said housing to the said axle.

In testimony whereof, I the said DON T. GLEASON, have hereunto set my hand.

DON T. GLEASON.

Witnesses:
R. D. BROWN,
JOHN F. WILL.